Dec. 10, 1968    A. S. MENIN ET AL    3,416,127
FISH COUNTING DEVICE

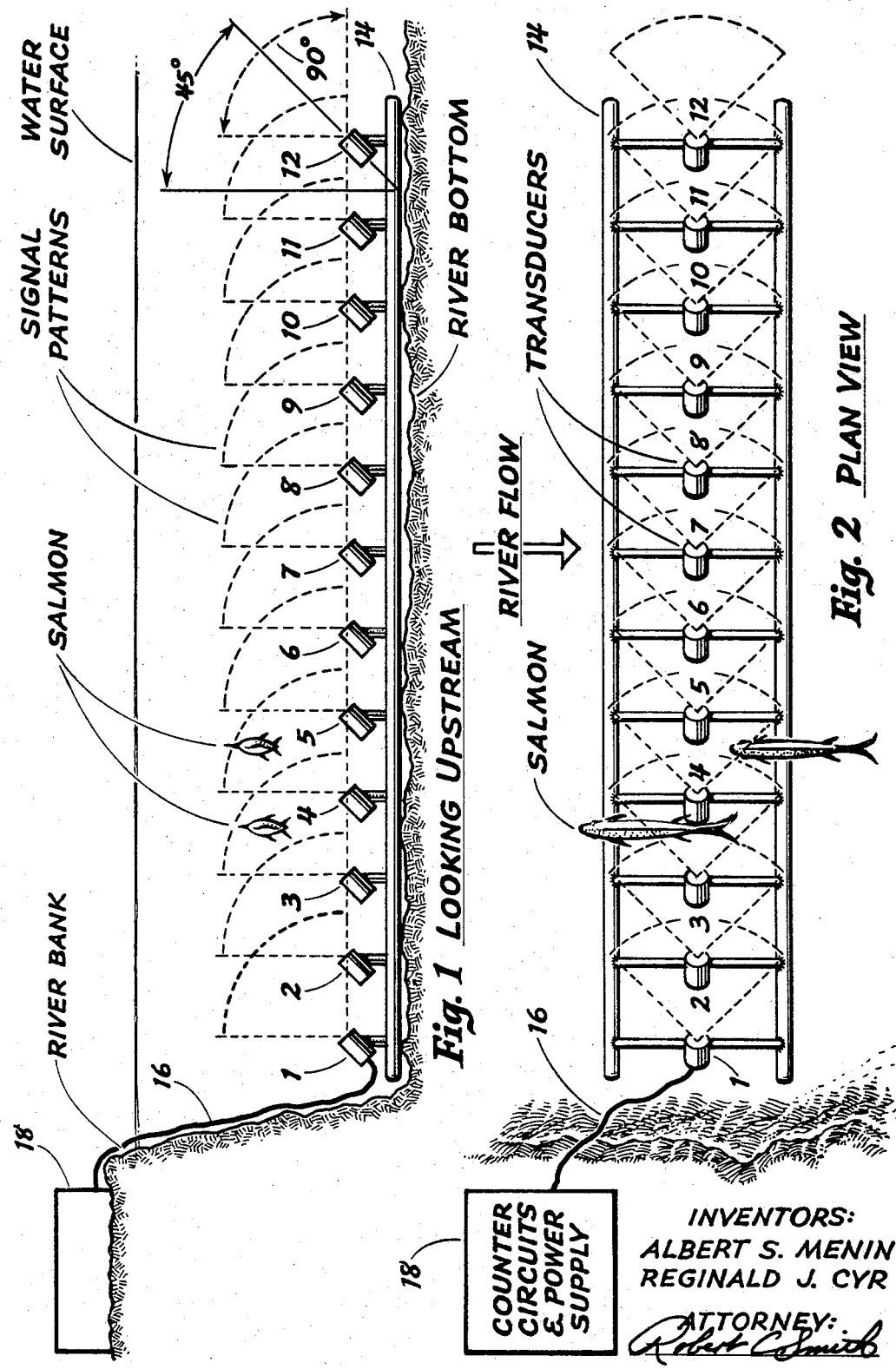

Filed Jan. 2, 1968    3 Sheets-Sheet 3

Fig. 4

MASTER CLOCK (INITIATES CYCLE)

(a) |←—240 MSEC—→|

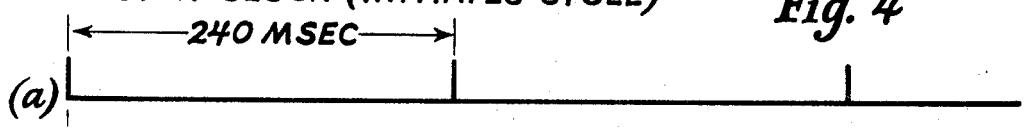

(b) RECEIVER POWER ON and REED RELAY #46 ON
|←9 MSEC→|

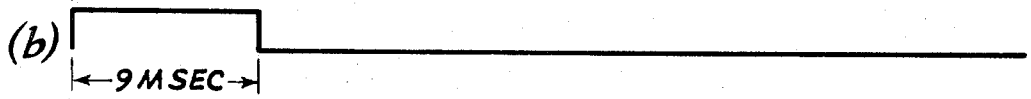

(c) RECEIVER POWER ON and REED RELAY #48 ON
|←9 MSEC→|

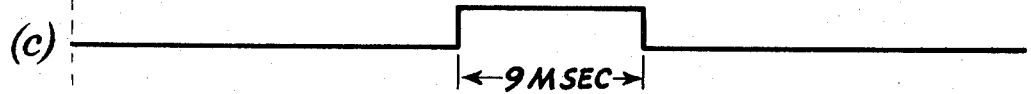

(d) RECEIVER POWER ON and REED RELAY #50 ON
|←9 MSEC→|

(e) |←4.4 MSEC LOGIC CYCLE HOLDOFF

(f) |←100 μSEC 100 KC TRANSMIT ON

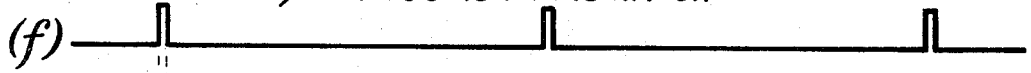

(g) |←150 μSEC INTEGRATOR ENABLE DELAY
         (PREVENTS RINGING)

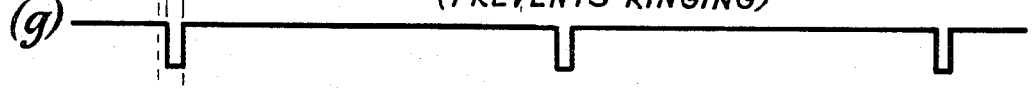

(h) |←1.2 MSEC INTEGRATOR ENABLE

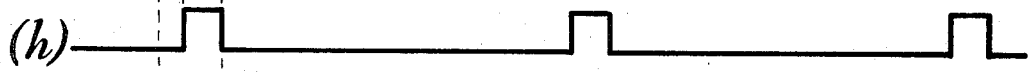

(i) V.C.O. ENABLE
|←200 MSEC→|

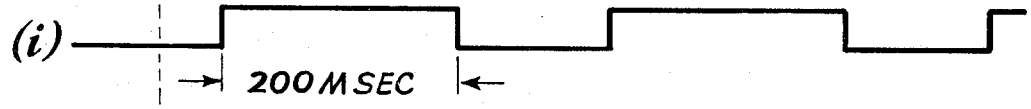

(j) |←4 MSEC
      T.V.G.

United States Patent Office 3,416,127
Patented Dec. 10, 1968

3,416,127
FISH COUNTING DEVICE
Albert S. Menin, Lakeview Terrace, and Reginald J. Cyr, Woodland Hills, Calif., assignors to The Bendix Corporation, a corporation of Delaware
Filed Jan. 2, 1968, Ser. No. 695,240
8 Claims. (Cl. 340—3)

ABSTRACT OF THE DISCLOSURE

A system for counting migrating fish in a stream using a series of acoustic transducers arranged on a structure extending out into the water perpendicular to the shore such that the fish swim across the structure, the transducers being electrically connected in groups to a counting circuit such that adjacent transducers will not count the same fish. The battery-powered counting circuit includes a master clock producing regular pulses which initiate the timing cycle for each group of transducers in rotation. During each cycle the power to the receiver and transmitter is turned on for a short period sufficient to enable return pulses to be received from the expected range and then turned off to conserve power. The received pulses are of varying amplitude due to the varying target strength of the fish as its aspect changes when passing through the sonar beam. Any received echoes exceeding a certain predetermined threshold trigger a monostable multivibrator to provide equal strength pulses which are then stored on a capacitor, and the capacitor voltage, which varies with the number of pulses, effectively controls the frequency output of a voltage-controlled oscillator whose output, in turn, operates an electromechanical impulse counter.

Background of the invention

This invention relates to sonar devices but involves a specific type for counting migrating fish in a stream. Because of the great importance of the salmon fishing industry, it has been found highly desirable to count the salmon swimming upstream to the spawning beds. Experience has shown that when the catch is too heavy, not enough salmon reach the spawning areas upstream in the rivers and lakes communicating with the ocean, and the hatch is small, thus reducing the numbers of fish available for the next season's catch. If too many salmon reach the spawning grounds, the roe of the later arrivals is deposited on that previously laid, and only a small proportion of the total reach the growth sufficient to migrate back to the ocean. This also effectively depresses the supply. It has become very important, therefore, to provide some means for counting the fish migrating in the streams and to do this on a day-by-day basis so that the cognizant government agencies may regulate the catch to keep the supply near the desired level. The usual manner of obtaining information to determine the permissible catch has been by aerial surveys and by making a visual count of the fish migrating upstream.

The visual count is usually made from towers strategically located along the migrating routes. The salmon seek the slowest current which is usually along the edge of the river near the bottom and during the migrating season will present a fairly continuous flow. Thus an observer can learn, with a little practice, to count the fish from the tower with fair accuracy. Tht usual practice is for the observers to count the fish for a ten-minute period every hour, and these figures are extrapolated to arrive at an hourly average to determine the total daily migration. This number is reported daily to a central tabulation station.

This visual counting scheme is obviously costly and is unsatisfactory for other reasons. Human error factors operate to reduce accuracy to some extent, and visual counting is often difficult or impossible when the water is silty or cloudy.

There have been a number of devices which use sonar techniques to find fish, particularly in combination with depth sounders. Applicants are aware of an earlier design for counting migrating fish which used Doppler techniques to distinguish moving fish from stationary objects, but since frequency shift occurs in many reflections, this approach proved unsatisfactory. Fish present a rather poor target for sonar, one which is sufficiently small that it is often difficult to distinguish between the fish and miscellaneous debris and entrained bubbles caused by rocks and turbulence. When the sensitivity of applicants' sonar was adjusted to count every fish, the number of false counts was too high. It was therefore necessary to reduce the sensitivity to avoid counting leaves, bubbles, etc. Obviously, this required some correlation with a visual count to effect the initial adjustment, but once this was done the count remained accurate within a few percentage points, effectively at least as accurate as visual counting over an extended period without attention.

Some attempts at counting migrating fish have contemplated the use of transducers looking downwardly from near the surface or looking from the edge across the stream. The first arrangement presents a problem in that bottom reflections are received which are hard to distinguish from fish, and the second arrangement must contend with both bottom and surface reflections and suffers from the further disadvantage that it is not oriented to receive reflections from the fish properly. Fish tend to swim in planes roughly parallel to the bottom, which means that a transducer looking across the stream will not "see" some fish hidden behind others.

Summary of the invention

The present invention overcomes many of the problems described above. By incorporating an array of transducers looking upward from the bottom, the problem of bottom reflections is effectively eliminated. Surface reflections then become a problem, but this has been dealt with by limiting the period during which echoes are received such that echoes from targets beyond a specified range are not counted. The range may be variable with the depth of the stream, but can be adjusted such that there is no response to reflections from within one or two feet from the surface. The range limitation means that signals will be received at each transducer from a volume which is similar to a cone having a 90° angle at its apex. If the transducers are located near the bottom and angled at about 45° with respect to the supporting structure, a series of receiving patterns may be produced which slightly overlap. In this way, practically all of the migrating fish will be in the reception zone of one of the transducers, even though some time is required for transmission at each transducer. Fish swimming in the same plane parallel to the bottom will tend to count separately because they are different distances from the transducer. To prevent adjacent transducers from each counting the same fish, the transducers are connected in groups such that the patterns of transducers within the group receiving simultaneously do not overlap. With this arrangement, a fish crossing the array at right angles will normally be counted only once, and more than one count would normally occur only in the infrequent situations where a fish stops or moves laterally in the receiving zone.

The power supply used herein relies on a conventional storage battery. An evaluation of the requirements of the transmitter and receiver indicates that the parts of the duty cycle wherein the greatest amounts of power are consumed can be reduced to a very small percentage of the entire time of operation. By continuously operating a master clock which produces regular pulses of low energy level, a means is provided for triggering or initiating the action of a number of timing circuits which control the flow of substantial amounts of power for only very short periods. In this manner a conventional storage battery can supply power to the system for over a month without attention. In the present system, the adjustment for range is quite straightforward and requires little time since it constitutes a single potentiometer adjustment. Since this adjustment will normally result in some counting error, the pulse rate of the master clock may be adjusted to provide compensation, after which the correlation over a substantial period of time is found to be within a few percentage points of the visual count.

By connecting a ring counter to the master clock and initiating power pulses for short periods, a first group of transducers is caused to transmit a short pulse and then receive for a longer period, depending upon the desired range from which echo signals are desired. Return echo signals received during the desired period are amplified, equalized and integrated over the listening period and then are "read out" or counted on a counter during a substantial part of the remainder of the master clock period during which most of the power is off. The next master clock pulse initiates an identical cycle for a second set of transducers, and the third pulse for a third set, etc., all the return echoes being supplied to an output integrator and from thence to the counter.

*Description of the drawings*

FIGURE 1 is a sectional view of a stream showing an array of transducers with their radiation patterns arranged across a part of the bottom of the stream according to our invention.

FIGURE 2 is a plan view showing the array of FIGURE 1 from above.

FIGURE 4 is a series of graphs showing the timing sequences and relationship generated in the system of FIGURE 3.

Figure 3:
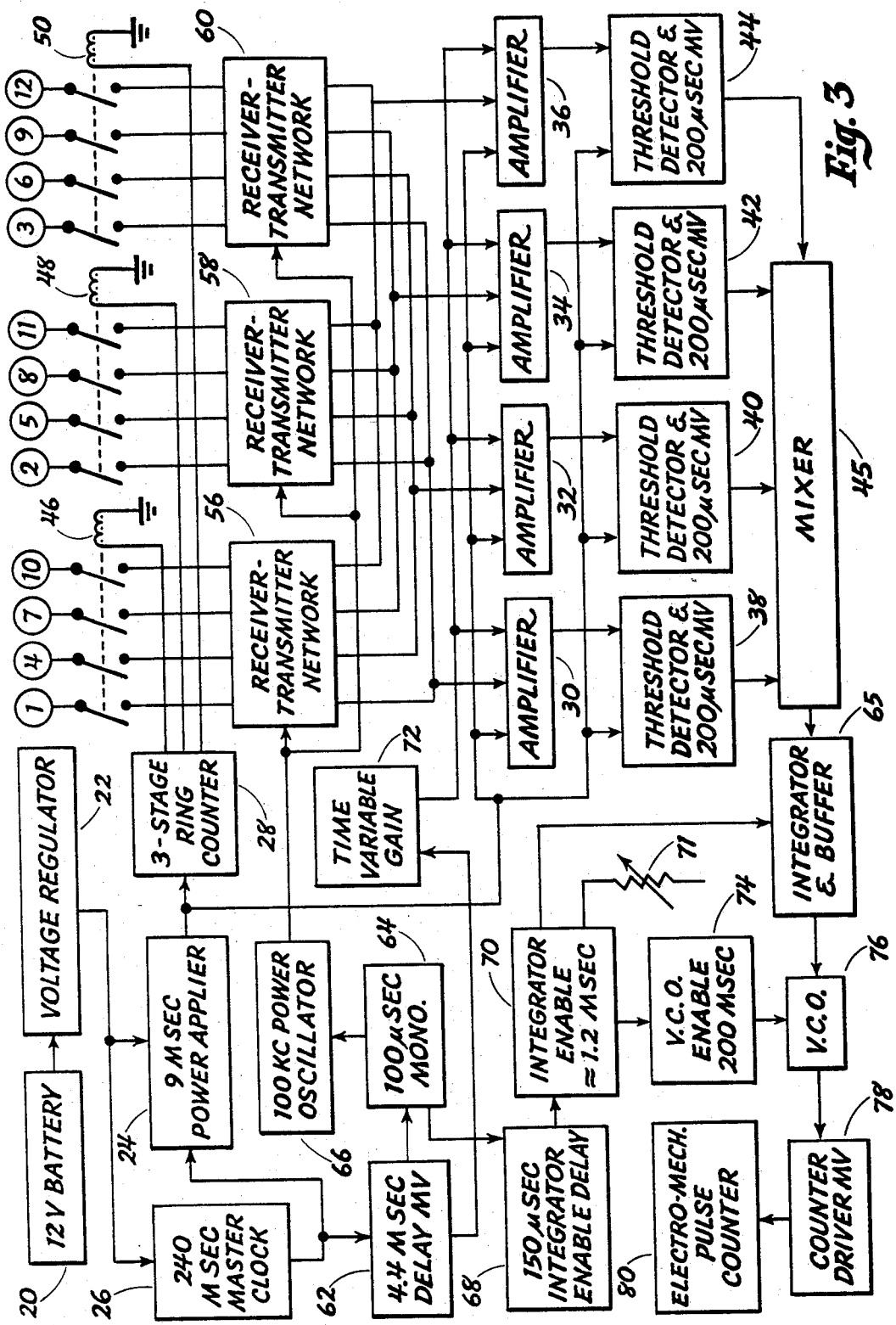
FIGURE 3 is a block diagram of our fish counting system.

*Description of a preferred embodiment of the invention*

Referring now to FIGURE 1, a cross-sectional view of a stream is shown including the bottom, one bank and the water surface. An array of acoustic transducers 1–12 is carried on a supporting structure 14 extending perpendicularly into the stream. The electrical connections to the transducers are carried by means of a cable 16 to the counting circuit which is contained in a housing 18. It will be observed that the radiation patterns of the transducers overlap to provide fairly complete coverage within a short distance from the bottom to a distance below the surface. The structure is placed in water sufficiently deep to prevent echoes from the surface to be within range. The fish normally will swim fairly close to the bottom to avoid the swiftest current, and a thirty-inch range has been found generally satisfactory for salmon.

FIGURE 2 shows the installation of FIGURE 1 as viewed from the top. It will be observed that the structure 14 supporting the transducer has a generally ladder-like configuration with spaced side rails to provide stability, thus preventing displacement of the transducer array. In these two views it will be observed that the approximate 45° orientation of the transducers 1–12 results in a series of overlapping conical radiation patterns.

FIGURE 3 is a block diagram of the counting circuits which are stored in housing 18, along with the battery. The battery 20, which may be a conventional 12-volt automobile lead-acid storage battery, is connected to a voltage regulator 22, and from thence to the block 24 entitled "9 Msec. Power Applier" which constitutes a monostable multivibrator and a solid state switch. The multivibrator receives a trigger signal from a master clock 26 which typically is a unijunction relaxation oscillator. This master clock is continuously connected to the output of the voltage regulator 22 and supplies precisely timed pulses at regular intervals to control a number of timing functions. In this device the timing intervals are set at 240 milliseconds, although a different interval could be chosen. When the clock pulse is supplied to the power applier 24, it causes the power applier to supply a substantial amount of power to the 3-stage ring counter 28; to a series of amplifiers 30, 32, 34 and 36 and to a series of threshold detectors and monostable multivibrators 38, 40, 42 and 44. This power is supplied for a timed period of nine milliseconds, and then it is shut off for the remainder of the 240-millisecond clock cycle.

FIGURE 4 is a series of graphs showing the time relationships of the several pulse outputs of the system of FIGURE 3. The regular 240 msec. clock pulse is shown in graph (*a*). Simultaneously with the beginning of each clock pulse, the 9-msec. power pulse begins. The scale of the graph is obviously compressed as to the long periods, since otherwise the relationships between the shorter intervals would be difficult to see. When the 9-msec. power pulse stops, the drain on the battery is reduced to a very low level until the next clock pulse triggers the next power pulse. The 9-msec. power pulses supplied to the ring counter 28 cause counter 28 to connect the power pulses sequentially to a series of reed relays 46, 48 and 50 which connect the separate groups of transducers to their respective receiver-transmitter networks 56, 58 and 60. See graphs (*b*), (*c*) and (*d*) of FIGURE 4 showing the relationships between the sequential power pulses. When reed relay 46 is energized, transducers 1, 4, 7 and 10 are connected to the receiver-transmitter network 56. Because of a tendency of the contacts to bounce, a 4.4-msec. delay is introduced through the action of a monostable multivibrator 62 to assure good contact at all of the relay switches before transmission. At the end of 4.4 msec., the multivibrator 62 enables a 100-$\mu$sec. multivibrator 64 which connects a 100-kHz. power oscillator 66 to the receiver-transmitter networks 56, 58 and 60 for 100-$\mu$sec. (see graphs (*e*) and (*f*)). This relatively narrow pulse width permits resolution of fish as close together as three inches, center to center. Since only transducers 1, 4, 7 and 10 are connected to their receiver-transmitter network 56, only these transducers will transmit a pulse. After the 100-$\mu$sec. transmit pulse is completed, the transducers 1, 4, 7 and 10 are in condition to receive echo signals, and these are transmitted through the receiver-transmitter network 56, the amplifier 30, the threshold detector and 200-$\mu$sec. monostable multivibrator 38, and the mixer 45, but these signals cannot be counted until the integrator and buffer circuit 65 is enabled. The trailing edge of the pulse frame multivibrator 64 then enables the 150-$\mu$sec. integrator enable delay multivibrator 68 which delays counting of returning echoes for 150-$\mu$sec. after transmitting to avoid errors because of "ringing" of the transducers. (See graph (*g*), FIGURE 4.) At the end of this period the integrator enable multivibrator 70 is enabled by multivibrator 68, and this circuit turns on the integrator and buffer circuit 65 for approximately 1.2 msec., depending upon the range of reception desired. (See graph (*h*), FIGURE 4.) This range, of course, depends somewhat upon the depth of the stream in which the array is located. Enabling circuit 70 is preferably made adjustable, as by means of a potentiometer 71, which, it will be understood, is connected into a conventional timing circuit such as an R-C circuit, such that the range may be varied with stream conditions.

The time variable gain circuit 72 is actuated in response to the 4.4 msec. delay multivibrator 62 and is turned off at the end of the 9-msec. power pulse. (Compare graphs (*b*) and (*c*) with graph (*j*), FIGURE 4.) Time variable gain is employed to improve the signal-to-noise ratio. If not used, reverberation signals at close range would be stronger than a fish echo at greater range. Thus the time variable gain increases the receiver gain as a function of time or range to compensate for transducer spreading losses at greater range.

Each returning echo appearing at the connected transducers and received during the approximately 1.2-msec. period which is of sufficient amplitude as to pass the threshold detector in circuits 38, 40, 42 and 44 will trigger a 200-μsec. monostable multivibrator, thereby supplying a pulse to the mixer 45. The mixer is used because there may be two or more pulses appearing at the same time (same range) from different transducers, and it is desired to count all such pulses. The mixed pulses then are supplied to the integrator and buffer circuit 65 where they charge an integrator capacitor in proportion to the total number of pulses received during the 1.2-msec. listening period. At the end of this period the charge on the capacitor is directly proportional to the number of 200-μsec. pulses received and therefore proportioned to the number of fish which have passed over the transducers.

At the end of the approximately 1.2-msec. period, the trailing edge of the integrator enable circuit 70 turns on an enabling circuit 74 which enables a voltage-controlled oscillator 76. This oscillator now "reads" the voltage on the integrating capacitor in the integrator and buffer circuit 65 and runs for 200 msec. at a rate determined by this voltage. (See graph (i), FIGURE 4.) If no echoes are received, there will be no pulses stored on the integrator capacitor and no output of the voltage controlled oscillator 76. If one 200-μsec. pulse is stored on the capacitor, there will be one cycle of oscillator 76. Eight pulses will build up a charge on the capacitor which will cause the oscillator to oscillate eight times during the 200-msec. period, etc. Every time the oscillator 76 oscillates, it fires a multivibrator 78 which, in turn, pulses a cumulative electromechanical impulse digital counter 80, which thus counts the total number of fish which have passed.

After a 240-msec. period, the master clock 26 initiates another cycle identical to that described except that the ring counter now closes relay 48, thus connecting transducers 2, 5, 8 and 11 to receiver-transmitter network 58. Another 240-msec. period of the clock pulse causes ring counter 26 to close relay 50, thus connecting transducers 3, 6, 9 and 12 to receiver-transmitter network 60. While the ring counter has been shown as a three-stage unit, with four transducers connected at one time, it will be apparent that a much larger array could be used in which ten or twelve transducers could be connected at a time. The purpose for commutation of the relays as described is that, first, it conserves somewhat on circuitry, and second, it provides a means for preventing the pulse transmitted from one transducer from being directly received by the adjacent transducer. The transducers are typically mounted on the array twenty inches apart, and the potentiometer 71 is normally set to limit the reception distance of pulses to thirty inches. Fish significantly farther away than thirty inches from a given transducer will normally be closer to the next active transducer and will be counted by that transducer.

Although the repetition rate of the master clock 26 has been described as 240 msec., this rate is chosen on the basis of observed salmon migration speed and is such that a salmon traveling at this observed speed will be in the beam of one of the transducers during its active period. As stated above, this rate may be adjusted to compensate for errors caused by adjustments in range.

While only a single embodiment is shown and described herein, it is understood that many modifications are possible, and we do not wish to be limited to the specific embodiment disclosed nor otherwise than as set forth in the following claims.

We claim:

1. A system for counting migrating fish swimming in a stream comprising:

a mechanical support structure adapted to be positioned on the bottom from near the shore thereof extending a substantial distance into said stream essentially perpendicularly with respect to the direction of stream flow, a plurality of acoustic transducers spaced along said structure essentially perpendicular to the direction of said stream, and electrical means connected to said transducers including switching means connecting said transducers in spaced groups, a source of electrical power, a master clock connected to said source for emitting pulses at regular intervals, a counter circuit connected to receive said clock pulses and distribute said pulses to said switching means to selectively energize said groups of transducers in rotation, a timing circuit connected to said source and to said clock which responds to said clock pulses and connects said source to part of said electrical means for a limited period of time, means responsive to initiation of power flow by said timing circuit for connecting transmitting pulses to one of said groups of transducers, means responsive to completion of said transmitting pulses for enabling said transducer to receive echo signals over a given time period, a plurality of receivers connected to said transducers and energized over said limited period of time, an integrating device for summing the received echo signals over a uniform time interval, and readout means responsive to the termination of the receiving and summing mode of said integrating device producing an output varying with the signal accumulated by said integrating device.

2. A system for counting migrating fish in a stream including a support structure extending from near the shore of said stream a substantial distance into said stream, a plurality of acoustic transducers spaced along said support structure, a source of electrical power, an electrical clock circuit connected to said source producing pulses at regular intervals, and receiver-transmitter means connected to said transducers and said source comprising means operative in response to said clock circuit supplying a transmit pulse to said transducers for a limited period, means operative subsequent to termination of the transmit pulse to delay processing of any received transducer signals for a very short time, means operative over a predetermined period for receiving and summing all echo pulses received by said transducers to produce a voltage variable with the sum of said received pulses, voltage controlled oscillator means connected to receive said variable voltage and to produce a pulse output whose frequency varies over a second predetermined time period with said voltage, and counter means connected to said oscillator means for counting the pulses in said pulse output.

3. A fish counting system as set forth in claim 2 wherein said electrical power source includes a battery.

4. A fish counting system as set forth in claim 2 wherein said transducers are connected together in groups and switching means are connected to said groups such that said groups are energized in rotation in response to said clock pulses.

5. A fish counting system as set forth in claim 4 wherein multivibrator means are operative in response to said clock pulses to connect said source to said transducers and said switching means.

6. A fish counting system as set forth in claim 2 wherein said receiver-transmitter further includes means responsive to said clock pulses for delaying the initiation of said transmit pulse for a predetermined length of time after said clock pulse.

7. A fish counting system as set forth in claim 2 wherein said means for summing echo pulses includes a network for receiving all echo signals from said transducers and means connecting said pulses to an integrating capacitor such that the voltage across said capacitor increases in proportion to the number of echo pulses received.

8. A fish counting system as set forth in claim 2 wherein said receiving means includes amplification means and time variable gain means is incorporated in said amplificaton means.

References Cited

FOREIGN PATENTS 908,905   10/1962   Great Britain.

RICHARD A. FARLEY, *Primary Examiner.*